United States Patent Office 2,921,965
Patented Jan. 19, 1960

2,921,965

AROMATIC SULFIDE-SULFONES

Joachim Dazzi, Dayton, Ohio, assignor to Monsanto Chemical Company, St. Louis, Mo., a corporation of Delaware No Drawing. Application December 26, 1957
Serial No. 705,086

3 Claims. (Cl. 260—607)

The present invention relates to aromatic compounds of sulfur and more particularly provides a new class of halogen-containing, aromatic sulfide-sulfones, the method of preparing the same, and improved rubbery materials prepared by vulcanization of natural and synthetic rubbers in the presence of the new sulfide-sulfones.

According to the invention, there are provided new and valuable chlorine-containing thiophenylene sulfones by the linear condensation reaction of bis(4-chlorophenyl) sulfone with sulfur in the presence of an inorganic alkaline compound, substantially according to the scheme:

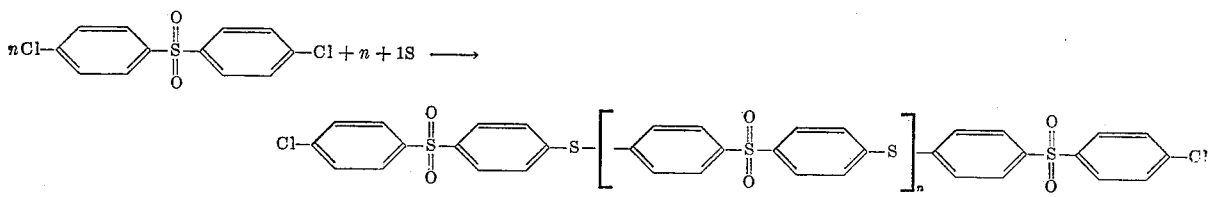

in which $n$ is a number of from 1 to 5.

Thiophenylene sulfones of the above formula are readily prepared, I have found, by heating at, say, a temperature of from 150° C. to 350° C., a mixture of bis(4-chlorophenyl) sulfone and sulfur in the presence of an inorganic alkali, e.g., an alkali metal or an oxide, hydroxide or a basic-reacting salt, thereof, until condensation of the sulfur with the sulfone has occurred. Since formation of the sulfide-sulfone requires one more atom of sulfur than the number of sulfone units present in the final product, the proportion of sulfur and bis(4-chlorophenyl) sulfone is advantageously employed in stoichiometric proportion. However, these reactants need not be employed in such proportions since an excess of either the sulfur or the sulfone can be readily separated from the sulfide-sulfone product, i.e., by washing and/or extraction. The quantity of inorganic alkali is also variable. While, theoretically, there should be present enough alkali to remove all of the chlorine from $n+1$ moles of the bis(4-chlorophenyl) sulfone, here again the stoichiometric quantities are not necessary; moreover, since an excess of sulfur will also act to dehalogenate the chloro-sulfone, the quantity of alkali present is thus a function of the amount of sulfur employed. However, even when a large excess of sulfur is present, some alkali must be used in order to initiate the reaction; and generally, in order to assure reaction of all of the chlorophenyl sulfone, it is recommended that an excess of the much less expensive alkali be present. Generally useful inorganic alkalis for the present purpose include the alkali metal hydroxides and basic salts thereof, e.g., sodium, potassium and lithium hydroxides, carbonates and acetates; the corresponding alkaline earth metal compounds, etc. The elemental alkali metals or alkaline earth metals may be employed, instead; but since these are less readily available, it is more expedient to use oxides, hydroxides or salts thereof.

The quantity of the units

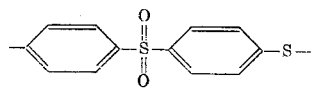

present in the present products depends upon the quantities of the reactants available as well as upon the heating time and temperature. Since formation of the sulfide-sulfones proceeds through a linear chain condensation reaction, the reaction mixture generally consists of products having a varying content of said units. Thus, initially there is probably formed the compound:

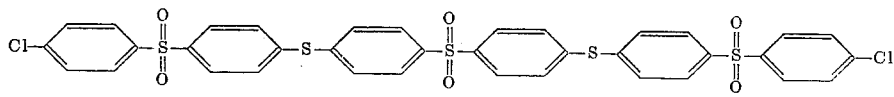

This then combines with an additional mole of chlorophenyl sulfone and sulfur to give

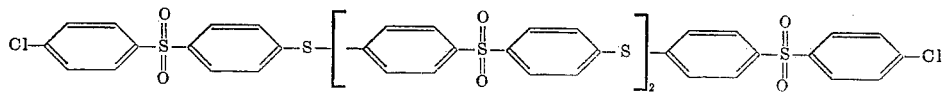

The chain reaction continues until as many as five of said units are present. However, as is generally the case in reactions of a linear condensation type, the final reaction mixture usually consists of products of varying degrees of condensation. While the individual constituents of the mixture can be separated from each other, e.g., by careful fractional extraction, for most purposes the mixtures of condensation products are useful as such.

The presently provided halogenated polymeric thiophenylene sulfones are stable, rather high-melting products which are advantageously used for a variety of commercial and agricultural purposes, e.g., as lubricant additives, rubber processing chemicals and as fungicides and biological toxicants in general. As will be shown hereinafter, they are characterized as efficient vulcanizing aids in that when incorporated with rubber, i.e., natural rubber or synthetic rubber such as the butadiene-styrene, or butadiene-acrylonitrile copolymers or isoprene or chloropene homopolymers, they accelerate curing of the compounded rubbers to give hard vulcanized products of improved properties.

The invention is further illustrated, but not limited, by the following examples:

Example 1

A mixture consisting of 48.8 g. (0.17) mole of bis(4-chlorophenyl) sulfone, 8.4 g. (0.263 mole) of sulfur, and 27.5 g. (0.260 mole) of sodium carbonate was heated in a sealed vessel at a temperature of 300° C. for 20 hours. After cooling, 74.2 g. of the resulting reaction mixture was ground and shaken with 550 ml. of water. It was then filtered and the 44.1 g. of precipitate thus obtained was extracted with about 400 ml. of ethanol. Drying of the residue gave 34.6 g. of the brownish-yellow powdery condensate, M.P. 103° C., and analyzing as follows:

|  | Found | Calcd. for $C_{12}H_8O_2S_2$ |
|---|---|---|
| Percent C | 56.14 | 58.2 |
| Percent H | 3.37 | 3.22 |
| Percent S | 24.67 | 25.8 |
| Percent Cl | 9.29 | 0.0 |

Since $C_{12}H_8O_2S_2$ is the empirical formula for the unit

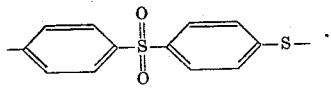

the above analysis shows the present product to be a mixture of condensates containing from 1 to 5 of said units together with, of course, the chlorine containing two end units.

Example 2

This example describes testing of the condensate of Example 1 as an auxiliary curing agent for natural rubber.

The following stocks were compounded on cold rolls.

|  | Stock I, parts by weight | Stock II, parts by weight |
|---|---|---|
| Natural Rubber-Smoked Sheet | 100 | 100 |
| Zinc | 5 | 5 |
| Sulfur | 3 | 3 |
| Stearic acid | 1 | 1 |
| Mercaptobenzothiazole | 1 | 1 |
| Example 1 condensate | 0 | 5 |

Curing was effected at 142° C. during the lengths of time shown below. Testing of the vulcanized products thus obtained gave the following values:

|  | Minutes Cure | Stock I | Stock II |
|---|---|---|---|
| 500% Modulus (p.s.i.) | 5 | 510 | 760 |
|  | 10 | 660 | 960 |
|  | 20 | 790 | 1,080 |
|  | 30 | 700 | 1,040 |
| Mooney Scorch (I+10) Min./135° C |  | 6.3 | 4.9 |

It will be noted from the above data that use of 5 parts of the Example 1 condensate leads to higher levels of modulus for all curing times. The condensate thus intensifies the vulcanization reaction. The Mooney scorch data also indicate stock II, which contains the condensate, as being more readily crosslinked. It thus appears that the condensate not only hastens the attainment of optimum modulus level but also acts either as an auxiliary cross-linking agent or else directs the cross-linking effectiveness of the sulfur to higher values.

What I claim is:

1. The method which comprises heating bis(4-chlorophenyl) sulfone with sulfur in the presence of an inorganic alkaline compound and recovering from the resulting reaction product a linear condensate of the formula

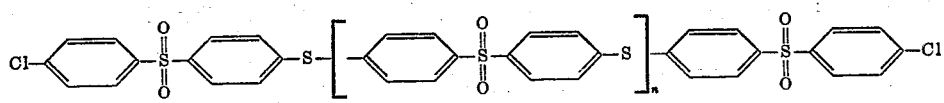

in which $n$ is a number of from 1 to 5.

2. The method which comprises heating, at a temperature of from 150° C. to 350° C. bis(4-chlorophenyl) sulfone with sulfur in the presence of an inorganic alkaline compound and recovering from the resulting reaction product a linear condensate of the formula

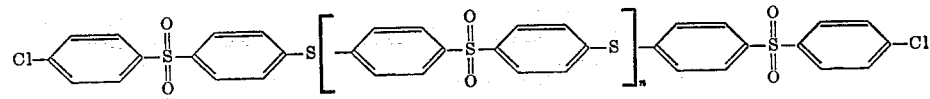

in which $n$ is a number of from 1 to 5.

3. The method which comprises heating, at a temperature of from 150° C. to 350° C., a mixture of sulfur, bis(4-chlorophenyl) sulfone, and sodium carbonate and recovering from the resulting reaction product a linear condensate of the formula

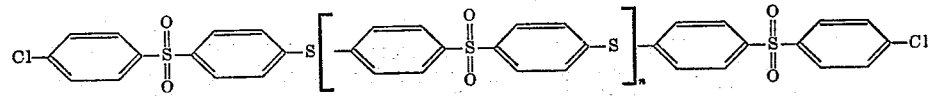

in which $n$ is a number of from 1 to 5.

References Cited in the file of this patent
UNITED STATES PATENTS
2,822,351   Kreuchunas _____ Feb. 4, 1958